United States Patent
Milton et al.

(10) Patent No.: US 7,590,092 B2
(45) Date of Patent: Sep. 15, 2009

(54) METHOD AND SYSTEM FOR INTER-TECHNOLOGY HANDOFF OF A HYBRID ACCESS TERMINAL

(75) Inventors: Lewis J. Milton, Glencoe, IL (US); Shahab M. Sayeedi, Naperville, IL (US); Xiang Xu, Jiangsu (CN)

(73) Assignee: Motorola Inc., Schaumburg, IL (US)

( * ) Notice: Subject to any disclaimer, the term of this patent is extended or adjusted under 35 U.S.C. 154(b) by 126 days.

(21) Appl. No.: 11/671,013

(22) Filed: Feb. 5, 2007

(65) Prior Publication Data

US 2007/0280264 A1   Dec. 6, 2007

Related U.S. Application Data

(60) Provisional application No. 60/809,270, filed on May 30, 2006.

(51) Int. Cl.
*H04W 4/00* (2009.01)
(52) U.S. Cl. .................. 370/331; 370/352; 370/401; 455/436
(58) Field of Classification Search ............... None
See application file for complete search history.

(56) References Cited

U.S. PATENT DOCUMENTS

| | | | | |
|---|---|---|---|---|
| 6,741,695 B1 * | 5/2004 | McConnell et al. | ......... | 379/229 |
| 6,970,452 B2 * | 11/2005 | Kim et al. | ................ | 370/352 |
| 7,333,445 B2 * | 2/2008 | Ilan et al. | ................ | 370/280 |
| 7,366,514 B2 * | 4/2008 | Ejzak | ................ | 455/436 |
| 2002/0085514 A1 | 7/2002 | Illidge et al. | | |
| 2002/0176382 A1 | 11/2002 | Madour et al. | | |
| 2003/0031150 A1 * | 2/2003 | Yukie | ................ | 370/338 |
| 2004/0120283 A1 | 6/2004 | Rezaiifar et al. | | |
| 2004/0125770 A1 | 7/2004 | Pitt et al. | | |
| 2004/0246990 A1 * | 12/2004 | Krishnamurthi et al. | .... | 370/466 |
| 2005/0243870 A1 | 11/2005 | Balogh et al. | | |
| 2005/0245261 A1 * | 11/2005 | Ejzak | ................ | 455/436 |
| 2005/0265304 A1 * | 12/2005 | Kim et al. | ................ | 370/349 |
| 2006/0019659 A1 * | 1/2006 | Rosenberg et al. | ....... | 455/432.1 |
| 2006/0083199 A1 * | 4/2006 | Yang | ................ | 370/331 |
| 2006/0109818 A1 | 5/2006 | Ramanna et al. | | |
| 2006/0154665 A1 * | 7/2006 | Svensson et al. | ............ | 455/436 |
| 2006/0238781 A1 * | 10/2006 | Fukao | ................ | 358/1.9 |
| 2006/0251058 A1 * | 11/2006 | Xu et al. | ................ | 370/352 |
| 2006/0256752 A1 * | 11/2006 | Svensson et al. | ............ | 370/331 |
| 2006/0268840 A1 | 11/2006 | Xu et al. | | |
| 2007/0002831 A1 * | 1/2007 | Allen et al. | ................ | 370/352 |
| 2007/0183405 A1 * | 8/2007 | Bennett | ................ | 370/352 |

\* cited by examiner

*Primary Examiner*—Bob A Phunkulh
(74) *Attorney, Agent, or Firm*—Steven A. May (57) ABSTRACT

A communication system utilizes an interface terminating at a base station (BS) of a circuit services network and a wireless packet data node in a packet data network and DOS over DBM signaling between the BS and an access terminal (AT), thereby permitting the communication system to tunnel SIP messaging between the AT and an IMS network via the BS and a packet data node and to tunnel HRPD traffic channel information and an HRPD identifier from the packet data network to the AT via the BS. Thus, a handoff of a voice call involving the AT may be initiated from the circuit services network to the packet data networking prior to the AT establishing a call dialogue with the packet data network.

41 Claims, 5 Drawing Sheets

METHOD AND SYSTEM FOR INTER-TECHNOLOGY HANDOFF OF A HYBRID ACCESS TERMINAL

CROSS-REFERENCE TO RELATED APPLICATION

This application claims priority from provisional application Ser. No. 60/809,270, entitled "METHOD AND SYSTEM FOR INTER-TECHNOLOGY HANDOFF OF AN ACCESS TERMINAL," filed May 30, 2006, which is commonly owned and incorporated herein by reference in its entirety.

FIELD OF THE INVENTION

The present invention relates generally to wireless communication systems, and more specifically to handover of an access terminal between cellular communication networks implementing different air interface technologies.

BACKGROUND OF THE INVENTION

The evolution of cellular communications has resulted in a proliferation of networks of different technologies and corresponding different air interfaces. As a result, during the course of a single call, a wireless mobile station may roam among multiple radio access networks (RANs), wherein each such RAN implements a different technology than the other RANs of the multiple RANs. Some examples of the different packet data network technologies include cdma2000 high rate packet data (HRPD) also known as 1xEV-DO (1X Evolution Data Only), cdma2000 1XRTT, cdma2000 1x-EV-DV (1x Evolution Data/Voice), IEEE 802.11b/g, and IEEE 802.16. An example of a circuit RAN is a cdma2000 1X RAN providing only circuit voice or circuit data service.

As the mobile station roams among a circuit services RAN, such as a cdma2000 1X RAN, and a packet data RAN providing packet data services, it may be beneficial to system performance to handoff the mobile station from the circuit services RAN to the packet data RAN. For example, the channel conditions associated the latter RAN may be more favorable than the channel conditions associated with the former RAN due to such factors as fading, adjacent and co-channel interference, and available power at a serving base station (BS) or radio access network (RAN). By way of another example, an operator of both a legacy circuit network and an HRPD network may desire to move the mobile station from one such network to the other network for purposes of system loading.

Currently, the only defined method for executing a handoff from a legacy cdma2000 1X circuit services RAN to an HRPD packet data RAN is an execution of a dormant hard handoff as defined by the 3GPP2 (Third Generation Partnership Project 2) A.S0008-B v0.2 and A.S0009-B v0.2 HRPD Inter Operability Specification (IOS) standards (V&V versions), wherein a mobile station must go dormant and drop a radio resource of a network of a first cdma2000 technology and then acquire a radio resource of a network of a second cdma2000 technology. A result is a brief period of time during which the mobile station is not actively engaged in a communication session with either network. Further, when executing a dormant hard handoff there is no linkage between the two networks as the mobile station must drop the first network and acquire the second network without any assistance from the BS or AN of either network. As a result, voice/data traffic may be lost during the handoff, resulting in poor system performance and efficiency and disgruntled end users.

Therefore, a need exists for a method and apparatus for implementing an active hard handoff of a communication session from a circuit services RAN providing circuit voice and data services support to a packet data RAN providing packet data services support that minimizes an amount of time that a mobile station is not actively engaged in a communication session with either network during the handoff.

DETAILED DESCRIPTION OF THE INVENTION

To address the need that exists for a method and apparatus that implements a handoff of a communication session from a circuit services network to a packet data network, a communication system is provided that utilizes an interface terminating at a base station (BS) of the circuit services network and a packet data node in the packet data network and DOS over DBM signaling between the BS and an access terminal (AT), thereby permitting the communication system to tunnel SIP messaging between the AT and the packet data node via the BS and to tunnel HRPD traffic channel information and an HRPD identifier from the packet data network to the AT via the BS. Thus, a handoff of a voice call involving the AT may be initiated from circuit services network to the packet data network prior to the AT establishing a call dialogue with the packet data network. By facilitating an exchange of handoff information among packet data network, and in particular the wireless packet data node, and the AT via circuit services network, and in particular the BS, handoff latency delays are reduced.

Generally, an embodiment of the present invention encompasses a method for inter-network handoff of a circuit voice call from a circuit services network to a Voice over Internet Protocol (VoIP) call on a packet data network. The method includes conveying forward link voice traffic to, and receiving reverse link voice traffic from, an AT via the circuit services network and determining to hand off the call. The method further includes, in response to determining to hand off the call and while continuing to support the call, conveying, by a BS of the circuit services network to a wireless packet data node of the packet data network, a request to hand off the call to the packet data network as a VoIP call and, in response to conveying the request, receiving a confirmation from the packet data network to accept the hand-in as a VoIP call. The method further includes conveying, by the BS to the AT, information associated with the packet data network and a new active set for facilitating a handoff to the packet data network and acquiring the AT by the packet data network and providing the AT with packet data services.

Another embodiment of the present invention encompasses a communication system that provides for inter-network handoff of a voice call from a circuit services network to a packet data network. The system includes a BS that supports a circuit switched voice call and that transmits forward link voice traffic to an AT via a forward link and receives reverse link voice traffic from the AT via a reverse link as part of the circuit switched voice call. The BS further determines to hand off the call to the packet data network, in response to determining to hand off the call and while continuing to support the call, conveys to a packet data node of the packet data network a request to hand off the call to the packet data network as a VoIP call, in response to conveying the request to handoff, receives a confirmation of the packet data network's acceptance of the hand-in as a VoIP call, and conveys to the AT information associated with the packet data network and a new active set for facilitating a handoff to the packet data network. The system further includes a packet data node of the packet data network that is in communication with the BS and that receives from the BS the request to hand off the call, in response to receiving the request, conveys a confirmation of an acceptance of the hand-in as a VoIP call to the base station, and acquires the AT and provides the AT with packet data services.

Yet another embodiment of the present invention encompasses a BS that supports a circuit switched voice call and that is configured to transmit forward link voice traffic to an AT via a forward link and receive reverse link voice traffic from the AT via a reverse link as part of the circuit switched voice call, determine to hand off the call to a packet data network, in response to determining to hand off the call and while continuing to support the call, convey, to a wireless packet data node of the packet data network, a request to hand off the call to the packet data network as a VoIP call, in response to conveying the request to handoff, receive from the packet data node a confirmation of an acceptance by the packet data network of a hand-in as a VoIP call, and convey to the AT information associated with the packet data network and a new active set for facilitating a handoff of the AT to the packet data network.

Still another embodiment of the present invention encompasses a packet data node that supports a packet switched voice call and that is configured to receive, from a BS in a circuit services network, a request to hand off a voice call associated with an AT to a packet data network comprising the wireless packet data node as a VoIP call, in response to receiving the request, convey a confirmation of acceptance of a hand-in of the call as a VoIP call, and acquire the AT and provide the AT with packet data services.

Figure 1:
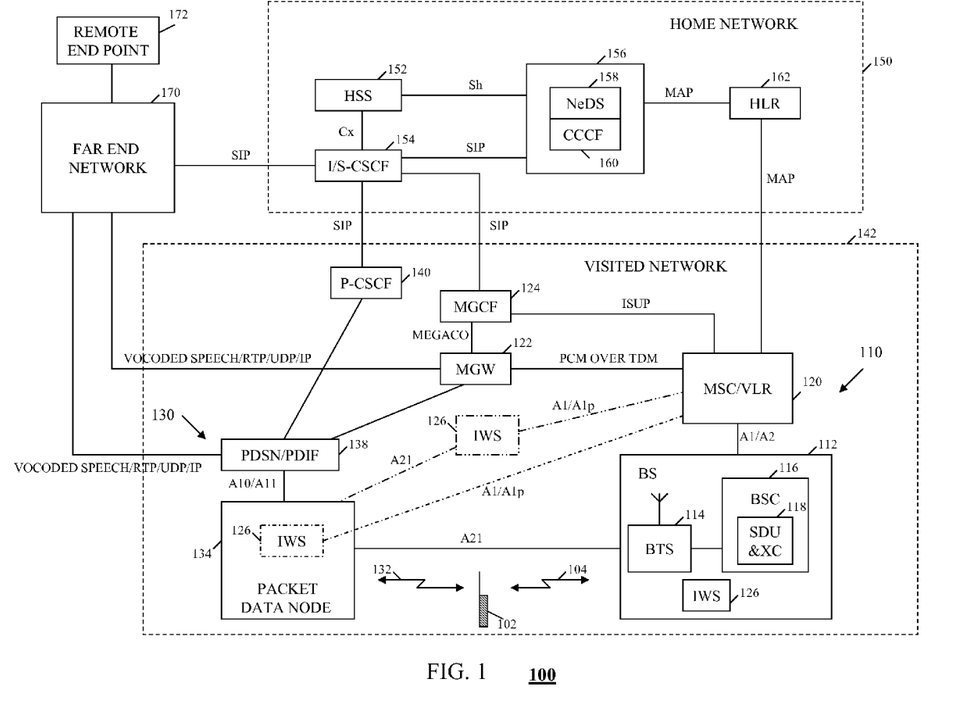
FIG. 1 is a block diagram of a wireless communication system in accordance with various embodiments of the present invention.

Turning now to the drawings, the present invention may be more fully described with reference to FIGS. 1-5C. FIG. 1 is a block diagram of a wireless communication system 100 in accordance with various embodiments of the present invention. Communication system 100 includes a wireless access terminal (AT) 102, for example but not limited to a cellular telephone, a radiotelephone, or a Personal Digital Assistant (PDA), personal computer (PC), or laptop computer equipped for wireless voice communications. In various communications systems, AT 102 may also be referred to as a subscriber unit (SU), a mobile station (MS), a hybrid terminal, or a user's equipment (UE). AT 102 is capable of engaging in a packet data call with packet data network 130 and is further capable of engaging in a circuit voice or data call with circuit services network 110, and more particularly is capable of communicating with packet data node 134 via the 3GPP2 C.S0024 protocol and with BS 112 via the 3GPP2 C.S0001-C.S0005 protocols.

As depicted in FIG. 1, AT 102 is associated with a first, home network 150 but resides in a second, visited network 142. Visited network 142 includes both a wireless circuit services cellular communication network 110, such as a cdma2000 (Code Division Multiple Access 2000) 1X network, and a wireless packet data communication network 130 that provides VoIP services, such as a cdma2000 HRPD (High Rate Packet Data) packet data communication network 130. Circuit services network 110 includes a Base Station (BS) 112 that comprises a Base Transceiver Station (BTS) 114 operably coupled to a Base Station Controller (BSC) 116. BS 112 is coupled to a Mobile Switching Center (MSC) 120 via both a signaling (A1) and a bearer (A2) interface. MSC 120 includes a call control and mobility management functionality (not shown), such as a Visited Location Register (VLR), and a switching functionality (not shown) and is coupled to a Media Gateway (MGW) 122 via a bearer interface, preferably a Pulse Code Modulation over Time Division Multiplexing (PCM over TDM) interface. Circuit services network 110 further includes a Media Gateway Control Function (MGCF) 124 that is coupled to each of MGW 122 and MSC 120 via a signaling interface, preferably to MGW 122 via a Media Gateway Control protocol (Megaco) interface and to MSC 120 via an ISDN User Part (ISUP) interface.

BSC 116 provides selection and distribution unit functionality 118 with respect to messages received from Access Terminals (ATs) serviced by the BSC and further provides transcoding functionality 118 with respect to transcoding between the vocoder formats provided by the ATs and the vocoder formats provided by networks coupled to network 110, such as a 64 kbps PCM format (ITU-T G.711). However, in other embodiments of the present invention, the transcoding functionality may reside in MSC 120 instead of BSC 116. MGW 122 provides a gateway for circuit services network 110 to far end far end network 170, for example, an external data network such as an Internet Protocol (IP) network such as the Internet. When AT 102 is engaged in a voice call with a remote end point 172 via circuit services network 110 and far end network 170, MGW 122 converts Pulse Code Modulation (PCM) signals received from MSC 120 to data packets, for example, based on a Real Time Protocol/User Datagram Protocol/Internet Protocol (RTP/UDP/IP) protocol suite, for routing to external data network 170 and converts voice data received from data network 170 to a PCM over TDM (Time Division Multiplex) format for routing to MSC 120.

Packet data network 130 comprises a packet data node 134 coupled to a Packet Data Serving Node (PDSN) 138, or when packet data network 130 is a WLAN network to a Packet Data Interworking Function (PDIF), via a bearer (A10) interface and a signaling (A11) interface. PDSN 138 further has a signaling control path connection with a Proxy-Call Session Control Function (P-CSCF) 140 and is connected to far end network 170 via an interface supporting the RTP/UDP/IP protocol suite for an exchange of packet data when engaged in a packet data session with a remote end point. Packet data node 134 provides wireless packet data communication services to ATs located in a coverage area of the packet data node. Packet data node 134 comprises a wireless Access Network (AN) (not shown), such as a BTS coupled to a BSC, an Access Point (AP), or a Node B coupled to a Radio Network Controller (RNC). Packet data node 134 may further comprise a Packet Control Function (PCF) (not shown) that may be coupled to the AN via one or more of a bearer connection and a signaling connection, such as an A8 and an A9 interface. When packet data node 134 comprises an AN and a PCF, the functionality described herein as being performed by packet data node 134 may be performed by either the AN or the PCF or may be distributed among the AN and the PCF.

Each of BS 112 and packet data node 134 provides wireless communication services to Access Terminals (ATs) located in a coverage area of the BS or packet data node via a respective 1X air interface 104 and HRPD air interface 132. Each air interface 104, 132 includes a forward link that includes a pilot channel, at least one forward link traffic channel, and forward link common and dedicated signaling channels. Each air interface 104, 132 further includes a reverse link that includes at least one reverse link traffic channel, reverse link common and dedicated signaling channels, and an access channel.

Circuit services network 110 and packet data network 130, and more particularly BS 112 and packet data node 134, communicate with each other via an Inetrworking Solution function (IWS) 126. IWS 126 provides an interworking function between packet data network 130 and circuit services network 110 via an A21 inter-RAN interface and supports A21 signaling with the circuit services network. An inter-RAN interface is described in detail in U.S. patent application Ser. No. 11/141,926, attorney docket number CE13247R, which patent application is commonly owned and incorporated herein by reference in its entirety. Further, an A21 inter-RAN interface and an IWS are described in the 3GPP2 A.S0008-B v0.2 and A.S0009-B v0.2 standards. IWS 126 interfaces to packet data network 130 and supports packet data, and in particular HRPD, signaling. IWS 126 provides an interworking function allowing packet data network 130 to convey HRPD air interface signaling to an AT in the circuit services network, thereby permitting an HRPD message to be transported over circuit services network 110 to the AT. For example, the circuit service network may transport an HRPD air interface message in an HRPD Data Over Signaling (DOS) message over a circuit services network Data Burst Message (DBM) (DOS over DBM).

In one embodiment of the present invention, IWS 126 may be collocated at BS 112, and further may be located in either BTS 114 or BSC 116, and may be connected to packet data node 134 via an inter-RAN interface, that is, an interface terminating at BS 112 in circuit services network 110 and at packet data node 134 in the packet data network 130, preferably an A21 interface. In another embodiment of the present invention, IWS 126 may collocated at packet data node 134, and further may be located in either the AN or the PCF when the packet data node comprises an AN and/or a PCF, and may be connected to MSC 120 via an A1/A1p interface, and via the MSC to BS 112. When IWS 126 is collocated at packet data node 134, the A21 interface is internal to the packet data node. In yet another embodiment of the present invention, IWS 126 may be a standalone IWS that may be accessed by packet data node 134, for example, via an A21 interface, and by MSC 120, for example, via an A1/A1p interface. The A21 interface is used to transparently pass 1X air interface signaling messages between packet data node 134, and in particular a PCF or an AN of the packet data node when the packet data node includes a PCF and/or an AN, and IWS 126 or, when the IWS is collocated at BS 112, between packet data node 134 and the BS 112. In communication system 100 and unlike in the prior art, the A21 interface is further used to pass HRPD air interface signaling from packet data node 134, and in particular a PCF or an AN of the packet data node when the packet data node includes a PCF and/or an AN, to circuit services network 110.

If circuit services network 110 includes support for packet data services and a packet data session has been established for an AT such as AT 102, a Short Data Burst (SDB) feature of network 110 permits the transfer of packet data frames between the network and AT 102 over a traffic channel of network 110 when the AT is engaged in a circuit voice call or active packet data call, and over a common channel of network 110 if the AT's packet data session is dormant and the AT is not engaged in a circuit voice call. Packet data network 130 provides a Data Over Signaling (DOS) feature for a transfer of 'higher layer' data between the packet data network and an AT, such as AT 102, over either a common channel or a traffic channel of the packet data network when its packet data session has been established and is anchored in the packet data network. For example, the SDB and DOS features may be used to transfer instant messaging text, email, or a web page to an AT without requiring a reactivation of the AT's packet data session, that is, while the AT's packet data session is dormant.

Each of circuit services network 110 and packet data network 130 communicates with an IP Multimedia Core Network Subsystem (IMS) of home network 150. The IMS comprises an Interrogating Call Session Control Function (I-CSCF) and a Serving Call Session Control Function (C-CSCF), hereinafter collectively referred to as I/S-CSCF 154, that are each coupled to a Home Subscriber Server (HSS) 152 via a signaling (Cx) interface. The IMS of home network 150 further comprises a Network Domain Selection (NeDS) 158 functionality and a Call Continuity Control Function (CCCF) 160, hereinafter collectively referred to as a CCCF/NeDS 156, that is coupled to HSS 152 via a signaling (Sh) interface and to I/S-CSCF 154 via a signaling interface capable of supporting Session Initiation Protocol (SIP). Although FIG. 1 depicts NeDS 158 and CCCF 160 as being implemented in a single network element, such as a single server, those who are of ordinary skill in the art realize that NeDS 158 and CCCF 160 may be implemented in separate network elements without departing from the spirit and scope of the present invention. Similarly, Although FIG. 1 depicts I-CSCF and C-CSCF as being implemented in a single network element, such as a single server, those who are of ordinary skill in the art realize that I-CSCF and C-CSCF may be implemented in separate network elements without departing from the spirit and scope of the present invention. CCCF/NeDS 156, and MSC 120 as well, are each further coupled to a Home Location Register (HLR) 162 via a signaling interface that supports an inter-system protocol, such as Mobile Application Part (MAP). Although single interfaces have been described herein between many of the network elements of communication system 100, each interconnection among elements may comprise multiple interconnections and/or interfaces, such as one or more of a signaling interface, for example, an interface for an exchange of SIP, ISUP, MAP, or Megaco messages, and a bearer interface or path, such a path for an exchange of voice information.

Figure 2:
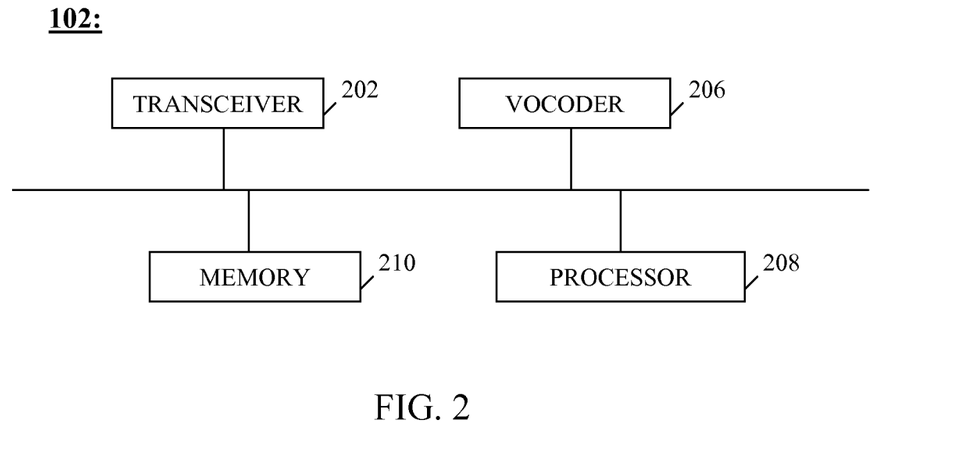
FIG. 2 is a block diagram of a Hybrid Access Terminal in accordance with an embodiment of the present invention.

Referring now to FIG. 2, an architecture of AT 102 is provided in accordance with an embodiment of the present invention. AT 102 may include at least one transceiver 202 that allows the AT to transmit or receive in each of the two networks. Transceiver 202 is coupled to a vocoder 206 and a processor 208, which processor is further coupled to an at least one memory device 210. AT 102 may maintain a priori information in at least one memory device 210 that facilitates the switching between networks 110 and 130. Processor 208 may comprise one or more microprocessors, microcontrollers, digital signal processors (DSPs), combinations thereof or such other devices known to those having ordinary skill in the art, which processor is configured to execute the functions described herein as being executed by AT 102. The at least one memory device 210 may comprise random access memory (RAM), dynamic random access memory (DRAM), and/or read only memory (ROM) or equivalents thereof, that store data and programs that may be executed by the associated processor and that allow AT 102 to perform all functions necessary to operate in communication system 100. When AT 102 has a dormant packet data session being maintained by packet data network 130, the at least one memory device 210 may further maintain Radio Link Protocol (RLP) information associated with the packet data session, such as an identification of an HRPD RLP flow to which packet data is to be sent, for example, an 'HRPD RLPFlowID.'

Figure 3:
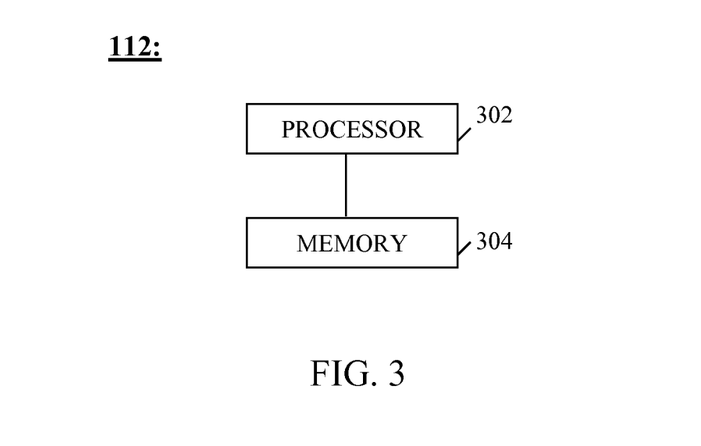
FIG. 3 is a block diagram of a base station in accordance with an embodiment of the present invention.
Figure 4:
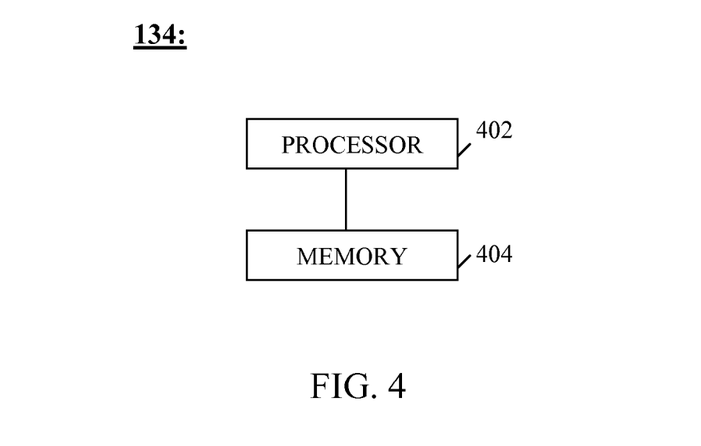
FIG. 4 is a block diagram of a packet data node in accordance with an embodiment of the present invention.

Referring now to FIGS. 3 and 4, an architecture of each of BS 112 and packet data node 134 is provided in accordance with an embodiment of the present invention. Each of BS 112 and packet data node 134 and includes a respective processor 302, 402, such as one or more microprocessors, microcontrollers, digital signal processors (DSPs), combinations thereof or such other devices known to those having ordinary skill in the art, which processor is configured to execute the functions described herein as respectively being executed by the BS and packet data node. Each of BS 112 and packet data node 134 further includes a respective at least one memory device 304, 404 that may comprise random access memory (RAM), dynamic random access memory (DRAM), and/or read only memory (ROM) or equivalents thereof, that store data and programs that may be executed by the associated processor and that allow the BS and packet data node to perform all functions necessary to operate in communication system 100.

The functionality described herein as being performed by AT 102, BS 112, and packet data node 134 is implemented with or in software programs and instructions stored in the respective at least one memory device 210, 304, and 404 of the AT, BS, and packet data node and executed by an associated processor 208, 302, and 402, of the AT, BS, and packet data node. When packet data node 134 comprises an AN and a PCF, the functions described herein as being performed by the packet data node may be performed by a processor included in the AN or a processor included in the PCF or may be distributed among the processors of the AN and the PCF based on data and programs respectively stored in a corresponding at least one memory device of the AN and the PCF. When BS 112 comprises BTS 114 and a BSC 116, the functions described herein as being performed by the BS may be performed by a processor included in BTS 114 or a processor included in BSC 116 or may be distributed among the processors of BTS 114 and BSC 116 based on data and programs respectively stored in a corresponding at least one memory device of BTS 114 and BSC 116. However, one of ordinary skill in the art realizes that the embodiments of the present invention alternatively may be implemented in hardware, for example, integrated circuits (ICs), application specific integrated circuits (ASICs), and the like, such as ASICs implemented in one or more of AT 104, BS 112, and packet data node 134. Based on the present disclosure, one skilled in the art will be readily capable of producing and implementing such software and/or hardware without undo experimentation.

In order for AT 102 to engage in a circuit voice call or a packet data call respectively via circuit services network 110 or packet data network 130, each of AT 102, circuit services network 110, and packet data network 130 operates in accordance with well-known wireless telecommunications protocols. Preferably, circuit services network 110 is a cdma2000 communication system that provides circuit switched communication services to subscribers serviced by the network (it may also provide packet data services) and that operates in accordance with the 3GPP2 C.S0001 to C.S0005 standards, which provides an air interface compatibility standard for CDMA 1X systems. Preferably, packet data network 130 is a cdma2000 (Code Division Multiple Access) communication system that provides HRPD communication services to subscribers serviced by the network and that operates in accordance with the 3GPP2 (Third Generation Partnership Project 2) C.S0024-A standard, which provides an air interface compatibility standard for cdma2000 HRPD (High Rate Packet Data) systems and the 3GPP2 C.S0075 standard, which provides HRPD-1x inter-technology air interface support. And preferably the IP Multimedia Core Network Subsystem (IMS) of Home Network 150 operates in accordance with the 3GPP2 X.S0013 standards, which describes the operation, elements, and interfaces of an IMS.

Further, circuit services network 110 and AT 102 preferably operate in accordance with the 3GPP2 A.S0011-A.S0017 Inter Operability Specifications (IOS) standards, which provide a compatibility standard for cellular mobile telecommunications systems that operate as a cdma2000 1X system. In addition, packet data network 130 and again AT 102 preferably operate in accordance with one or more of the 3GPP2 A.S0008-B v0.2 or A.S0009-B v0.2 (v&v versions) HRPD IOS standards, which provide compatibility standards for cellular mobile telecommunications systems that operate as a cdma2000 HRPD system. To ensure compatibility, radio system parameters and call processing procedures are specified by the standards, including call processing steps that are executed by an AT and a base station or other access network serving the AT and between the base station or other access network and associated infrastructure. However, those of ordinary skill in the art realize that packet data network 130 may operate in accordance with any one of a variety of wireless packet data communication systems that provide high rate packet data communication services, such as the IEEE (Institute of Electrical and Electronics Engineers) 802.xx standards, for example, the 802.11, 802.15, or 802.16 or 802.20 standards, and that circuit services network 110 may operate in accordance with any one of a variety of well-known conventional wireless telecommunication systems that provide circuit switched communication services.

It may be assumed, for purposes of the present invention, that AT 102 is engaged in a circuit voice call with circuit services network 110. In order to access circuit services network 110, AT 102 tunes to an operating frequency assigned to the circuit services network, acquires a pilot channel associated with a serving BS, such as BS 112, and then registers with MSC 120 via BS 112 and a reverse link access channel of air interface 104. Once AT 102 is registered, the AT may monitor a forward link paging channel of air interface 104. The paging channel may then be used to notify AT 102 when a voice call arrives via circuit services network 110. Alternatively, AT 102 may originate a circuit voice call after acquiring the pilot channel associated with BS 112 by requesting circuit voice service on a 3G1X reverse link access channel.

The paging channel is further used when packet data network 130 has received packet data from packet data network 152 and requests circuit services network 110 to page AT 102 to request the AT move to the packet data network so that the packet data can be delivered to the AT.

When AT 102 is not engaged in a voice call with, or monitoring a paging channel in, circuit services network 110, the AT may initiate a packet data call and register with packet data network 130, and more particularly with PDSN 150. AT 102 may then establish a data link with PDSN 138 in accordance with a Layer 2 protocol such as the Point-to-Point Protocol (PPP). The Point-to-Point Protocol may then be used to assign an IP address to AT 102. Once the IP address is assigned and a packet data session is established, AT 102 may communicate with packet data network 130 over a packet data network connection. The packet data network connection, comprising packet data node 134 and preferably comprising an AN and a PCF servicing AT 102 in network 130, is communicated by the packet data network 130 to MSC 120 and is stored by the MSC.

The C.S0024 standard provides for the packet data network packet data session to remain intact whether or not the connection is being used to support communications. That is, when AT 102 accesses packet data network 130 to establish a packet data session, the AT is assigned a traffic channel in air interface 132 and packet data is transferred to the AT via the traffic channel and the packet data network connection. During subsequent periods of inactivity in packet data network 130, for example, when AT 102 is active in a voice call in circuit services network 110, the traffic channel may be torn down but the packet data session remains intact. By maintaining the packet data session, AT 102 does not have to acquire a new IP address or establish a new PPP connection for a subsequent exchange of data. A packet data session that exists in the absence of a traffic channel is referred to as a "dormant" session.

In communication system 100, when AT 102 is engaged in a circuit voice call in circuit services network 110, the AT may roam through the system. As a result of the roaming, situations may arise where it is desirable to hand off AT 102 from circuit services network 110 to packet data network 130. For example and as is known in the art, while roaming in communication system 100 and being serviced by BS 112, AT 102 may receive a stronger signal from packet data node 134. Typically signal strengths are determined by an AT, such as AT 102, measuring a pilot channel associated with the packet data node or BS. When a pilot channel of a serving packet data node or BS is weaker than a threshold value and a pilot channel of another packet data node or BS, that typically indicates a desirability of a handoff.

By way of another example, the costs associated with operating AT 102 on circuit services network 110 may be different from the costs associated with operating AT 102 on packet data network 130. In turn, an operator (or operators) of networks 110 and 130 may charge a different fee for use of each network. As a result, a user of AT 102 may program into the subscriber a directive to operate on the lower cost network whenever the AT is able to obtain a traffic channel in the lower cost network. When AT 102 is engaged in a voice call in a higher cost network and is able to obtain a traffic channel in the lower cost network, the subscriber unit, or the user of the subscriber unit if the user is informed of the availability of a traffic channel in the lower cost network, may initiate a handoff to the lower cost network. By way of yet another example, it may be desirable to move a AT, such as AT 102, that is actively engaged in a voice call in circuit services network 110 to packet data network 130 when the user of AT 102 prefers to use video telephony service rather than a voice call, and packet data network 130 supports video telephony but circuit services network 110 does not. By way of still another example, for load leveling purposes, for network cost consideration purposes, or due to a need to clear traffic channels in a coverage area in order to facilitate emergency communications, an operator of a communication system such as communication system 100 may find it desirable to move an AT, such as AT 102, that is actively engaged in a voice call in circuit services network 110 to the other network.

In order to facilitate a handoff of an AT, such as AT 102, communication system 100 provides a method and apparatus for an active handoff of the AT from circuit services network 110 to packet data network 130 when the AT is actively engaged in a voice call in the circuit services network. By providing for an active handoff of a voice call from circuit services network 110 to packet data network 130, communication system 100 assures that the AT is actively engaged in a communication session with at least one of networks 110 and 130 at nearly all times, thereby minimizing the likelihood that voice or data traffic may be lost during the handoff.

Figure 5A:
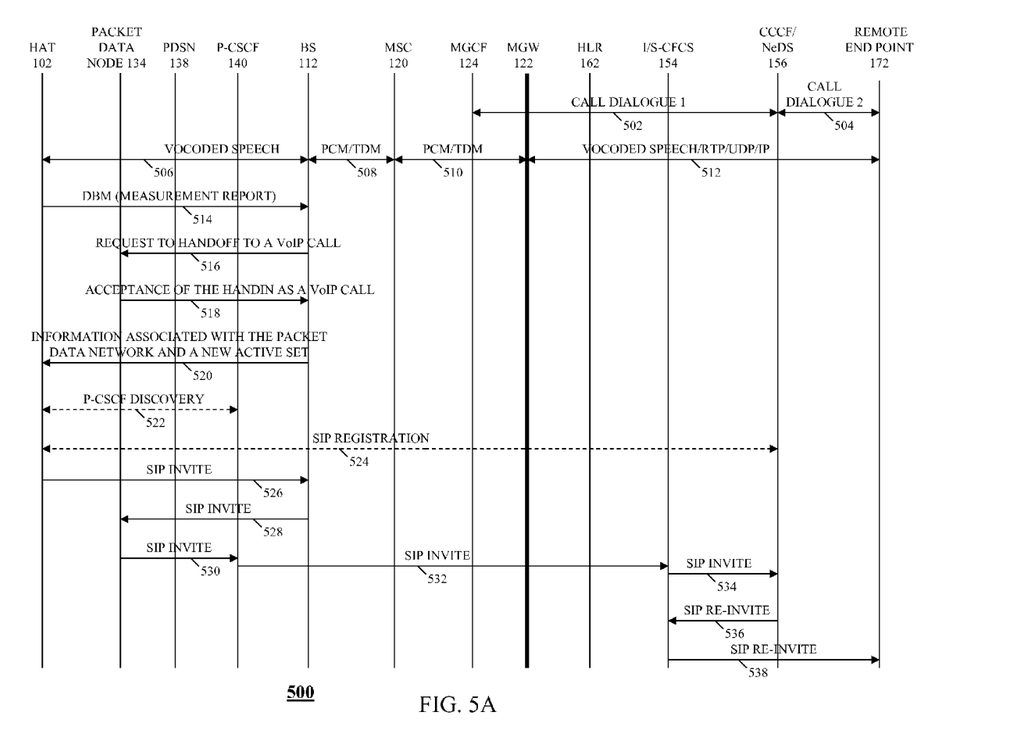
FIG. 5A is a signal flow diagram of a method executed by the communication system of FIG. 1 in handing off of a communication session from a circuit services network of FIG. 1 to a packet data network of FIG. 1 in accordance with various embodiments of the present invention.
Figure 5B:
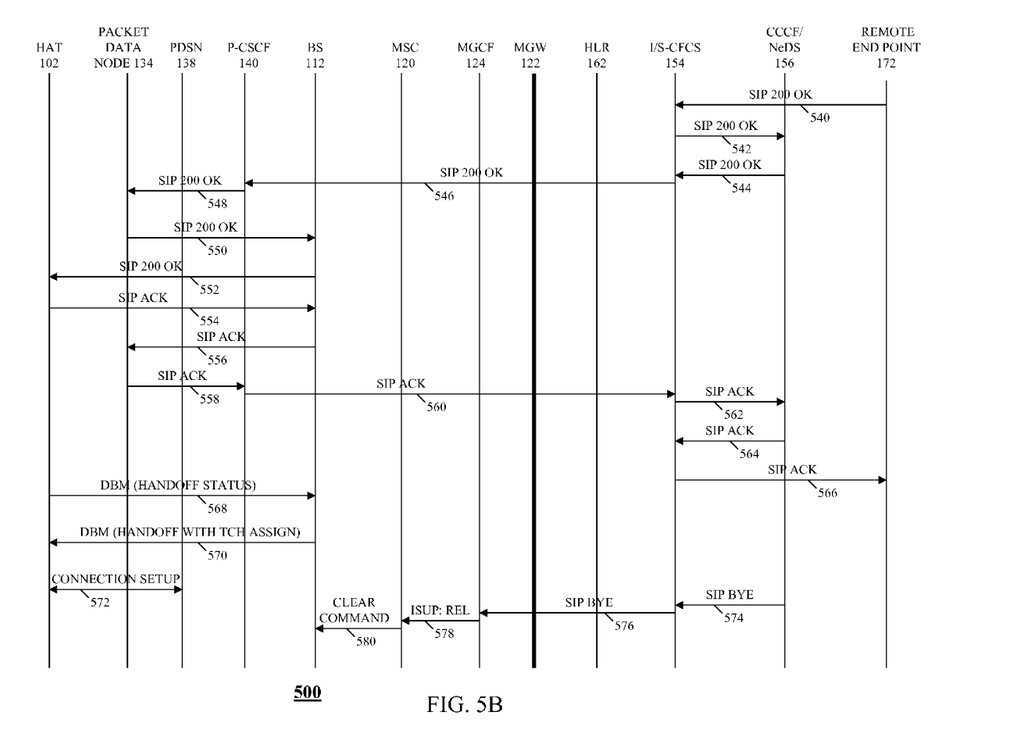
FIG. 5B is a continuation of the signal flow diagram of FIG. 5A depicting a method executed by the communication system of FIG. 1 in handing off of a communication session from a circuit services network of FIG. 1 to a packet data network of FIG. 1 in accordance with various embodiments of the present invention.
Figure 5C:
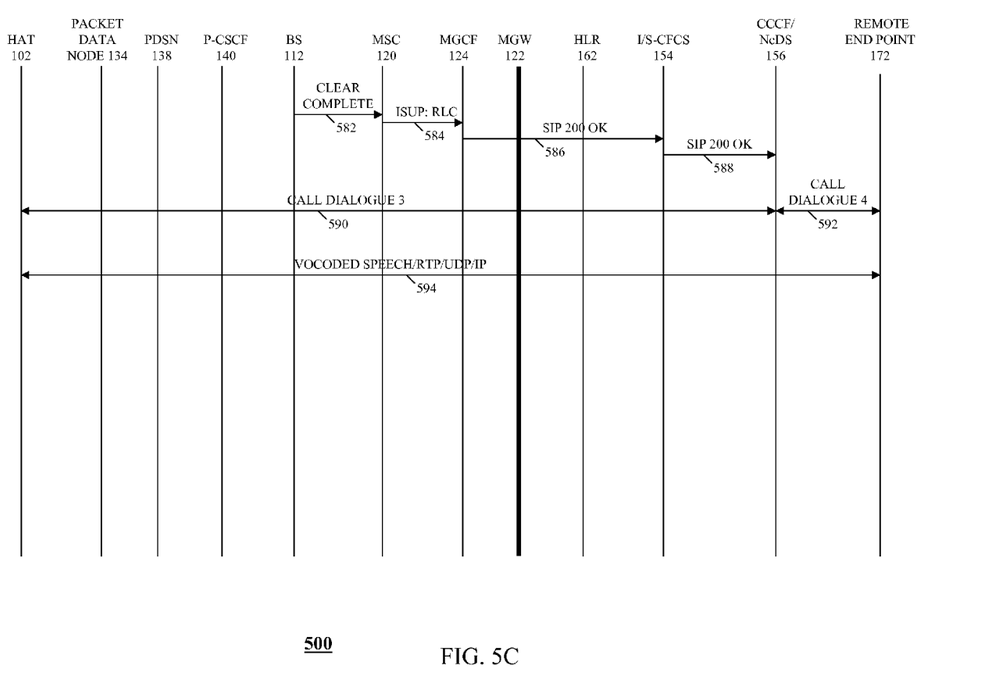
FIG. 5C is a continuation of the signal flow diagrams of FIGS. 5A and 5B depicting a method executed by the communication system of FIG. 1 in handing off of a communication session from a circuit services network of FIG. 1 to a packet data network of FIG. 1 in accordance with various embodiments of the present invention.

Referring now to FIGS. 5A, 5B, and 5C, a signal flow diagram 500 is provided that illustrates a method executed by communication system 100 in handing off AT 102 from circuit services network 110 to packet data network 130 in accordance with various embodiments of the present invention. Signal flow diagram 500 begins when AT 102 is engaged in a voice call with a remote end point 172 via circuit services network 110. In order to participate in the call, AT 102 must already be registered with circuit services network 110. As is known in the art, when AT 102 is pre-registered with the IMS, in order to set up the call MGCF 124 sets up 502 a Session Initiation Protocol (SIP) dialogue with CCCF/NeDS 156 via I/S-CSCF 154 and, in turn, CCCF/NeDS 156 sets up 504 a SIP dialogue remote with end point 172 via I/S-CSCF 154 and far end network 170. A path is then established for a transfer of voice information between AT 102 and remote end point 172.

In exchanging voice information, AT 102 exchanges 506 vocoded speech with BS 112 via air interface 104. BS 112 receives 506 vocoded speech from AT 102 via a reverse link traffic channel of air interface 104, transcodes the vocoded speech to 64 kbps Pulse Code Modulation (PCM) (G.711), and conveys 508 the transcoded speech to MSC 120. Similarly, BS 112 transcodes communications received from MSC 120 to a vocoder format compatible with AT 102 and transmits 506 the transcoded information to AT 102 via a forward link traffic channel of air interface 104. MSC 120 forwards 510 the PCM signals received from BS 112 to MGW 122 and forwards 510 PCM signals received from the MGW to the BS. MGW 122 transcodes PCM signals received from MSC 102 to vocoded speech, includes the vocoded speech in data packets, preferably formatted in an RTP/UDP/IP format, and routes 512 the data packets to remote end point 172 via far end network 170. MGW 122 further converts vocoded speech included in data packets received from remote end point 172 via far end network 170 to 64 kbps PCM (G.711) and routes 512 the PCM signals to MSC 120.

While AT 102 is in an active voice call in circuit services network 110, the AT monitors qualities, in particular a signal strength or alternatively any of a variety of other signal qualities such as a signal-to-noise ratio (SNR), a carrier-to-interference ratio (C/I), pilot power-to-total power (Ec/Io) ratio, a bit error rate (BER), or a frame error rate (FER), of pilots associated with each of BS 112 of circuit services network 110 and packet data node 134 of packet data network 130. AT 102 may monitor the pilots of each network 110, 130 concurrently or may switch between networks in monitoring the pilots. AT 102 may self-determine when or whether to monitor the pilots associated with packet data node 134 of packet data network 130 or may monitor the pilots in response to receiving an instruction to do so from circuit services network 110, and in particular one of BS 112 and MSC 120.

AT 102 reports 514 the monitored pilot(s) in accordance with well known reporting procedures. For example, when a monitored pilot exceeds a 1X intra-system soft handoff add threshold, the MS reports this pilot, and the measured pilot channel strength, to BS 112, and in particular to BSC 116, in a Pilot Strength Measurement Message (PSMM) conveyed to the BS via the reverse link of air interface 104. Similarly, when a monitored pilot falls below a 1X intra-system soft handoff drop threshold, the MS reports this pilot, and the measured pilot signal strength, to BS 112, and in particular to BSC 116, in a PSMM conveyed to the BS via the reverse link of air interface 104. BSC 116 then stores the reported network pilot measurements. A report of a pilot that exceeds a 1X intra-system soft handoff add threshold is an indicator to add a BS associated with that pilot to soft handoff with the MS and a report of a pilot that falls below a 1X intra-system soft handoff drop threshold is an indicator to drop a BS associated with that pilot from soft handoff with the MS.

When a quality of a pilot of packet data network 130, and more particularly of air interface 132, is measured by AT 102 when operating in circuit services network 110 and exceeds an inter-system hard handoff add threshold, or a quality of a previously reported pilot of packet data network 130, and more particularly of air interface 132, is measured by AT 102 when operating in circuit services network 110 and falls below an inter-system hard handoff drop threshold, the AT reports 514 the monitored HRPD pilot(s) back to BS 112, and more particularly BSC 116. BSC 116 then stores the reported HRPD pilot measurements.

AT 102 may report HRPD pilot strengths by sending a circuit services network 110 message delivery mechanism, such as a 1X Data Burst Message (DBM), to BS 112 on a reverse link dedicated signaling channel (r-dsch) of air interface 104 or a reverse link traffic channel of air interface 104 assigned to the call. The reverse link signaling message comprising the DBM may include a request for confirmation of delivery for the signaling message. Preferably, the DBM includes a BURST_TYPE field, or another identifier, that identifies the message as reporting HRPD pilot signal strengths. In response to receiving the DBM, BS 112 parses the message and recognizes the message as comprising an HRPD pilot signal strength measurement.

Based on the pilot measurements associated with BS 112 and the HRPD pilot measurements associated with packet data node 134 and reported by AT 102, circuit services network 110, and in particular BS 112 or MSC 120, may then determine to handoff AT 102 to packet data network 130 and packet data node 134. For example, when a pilot of BS 112 compares unfavorably to (is below, in the case of a signal strength threshold) the 1X intra-system soft handoff drop threshold and/or a pilot of packet data node 134 compares favorably to (exceeds, in the case of a signal strength threshold) the HRPD inter-system hard handoff add threshold, this may indicate a desirability of a handoff. By way of another example, costs associated with operating AT 102 on network 110 may be different from the costs associated with operating AT 102 on network 130. In turn, an operator (or operators) of networks 110 and 130 may charge a different fee for use of each network. If packet data network 130 is the lower cost network, a user of AT 102 may program into the MS a directive to operate on the second network 130 whenever a measurement of a pilot associated with the second network compares favorably to the HRPD inter-system hard handoff add threshold. By way of still another example, for load leveling purposes, for network cost consideration purposes, or due to a need to clear traffic channels in a coverage area in order to facilitate emergency communications, an operator of communication system 100 may find it desirable to move a AT, such as AT 102, that is actively engaged in a voice call in circuit network 110 to packet data network 130 whenever a measurement of a pilot associated with the second network compares favorably to the HRPD inter-system hard handoff add threshold.

In response to determining to handoff AT 102 from circuit network 110 and BS 112 to packet data network 130 and packet data node 134, BS 112 assembles a request to handoff the voice call as a Voice over IP (VoIP) call on the packet data network. Preferably, the request requests resources to support the call and comprises an A21-Resource Allocation Request message that includes a request that the packet data network allocate resources for AT 102. BS 112 then conveys 516 the request to packet data node 134, preferably via the inter-RAN interface such as an A21 interface. In response to receiving the resource allocation request, packet data node 134 determines whether AT 102 has an HRPD packet data session anchored in packet data network 130 and has an SSIR (session state information record) with an associated HRPD Radio Link Protocol (RLP) flow and an access terminal identifier, such as a Unicast Access Terminal Identifier (UATI)) assigned to the AT. For example, a dormant packet data session associated with the AT may be maintained by packet data network 130. As noted above, an AT's packet data session is considered to be in the dormant state when a PPP/Layer connection has been established between the AT and PDSN, A10 bearer resources have been allocated to the AT, but traffic channel and A8 bearer resources (between an AN and PCF of the packet data node) are not allocated to the AT.

If AT 102 does not have an HRPD packet data session anchored in packet data network 130, a pre-negotiated and pre-established 'dummy' session from a reserved pool of resources (for incoming ATs that don't have an assigned session) with a pre-configured session state information record (including an SSIR and at least an HRPD IP flow with appropriate QoS to support VoIP service) and a Point-to-Point Protocol (PPP) connection (Layer 2 protocol) may be assigned to the AT by packet data network 130, and preferably by packet data node 134, along with an access terminal identifier, such as a UATI, that is uniquely associated with the AT for the session. The pre-configured session may include pre-setup A10 connections and IP flows to support the VoIP call. AT 102 is aware of the packet data session configuration (SSIR) and PPP session when a hand-in to packet data network 130 is required either by operator configuration of the AT or by provision of this information at the time of the handoff, that is, by provision of this information to AT 102 by packet data node 134 via BS 112. The information then is maintained in the at least one memory device 210 of the AT and also is maintained in the at least one memory device 404 of the packet data node or otherwise is maintained in a location in packet data network 130 that is accessible by the packet data node. In either case, the SSIR and PPP session information may be preconfigured with default values such that PPP or HRPD session negotiation is not required at the time of the handoff, thereby allowing AT 102 to be handed off to packet data network 130 without requiring that a new packet data session be set up for the AT at the time of the handoff and without first requiring a conveyance of an SSIR to the AT over the air or negotiating SSIR with the AT, thereby reducing handoff latency delays. In response to receiving the request to allocate resources, packet data node 134 allocates resources to AT 102, if resources are available either from a pre-existing (for example, dormant) HRPD packet data session or from a preconfigured/reserved HRPD packet data session that is assigned to the AT, and assembles and conveys 518 to BS 112, preferably via the inter-RAN interface, a packet data network air interface signaling response, more particularly an HRPD DOS message, that comprises a confirmation by packet data network 130 to accept a hand-in of the call as a VoIP call.

When no resource is available at packet data node 134 for assignment to AT 102, packet switched node 134 may set a 'Cause' field in the response conveyed to BS 112, preferably an A21-Resource Reservation Response, to 'no resource.' The handoff may then end.

When a resource is available at packet data node 134 for assignment to AT 102, either from a pre-existing packet data session or from a preconfigured/reserved HRPD session to be assigned to AT, then the response conveyed by packet data node 134 to BS 112 may comprise an A21-Resource Allocation Response message. The message may include one or more of traffic channel assignment information for AT 102 and associated with a traffic channel in air interface 132, the pre-configured session state information, and the UATI assigned to the AT for the session. If the AT changed HRPD subnets during the circuit switched voice call, then packet data node 134 may use an A13 procedure to retrieve the AT's information from a source packet data node before packet data node 134 allocates resources to the AT. In response to receiving the response from packet data node 134, BS 112 conveys 520 a message to AT 102 comprising information for facilitating a handoff to packet data network 130, and preferably to packet data node 134, including one or more of the traffic channel information associated with traffic channel assigned in air interface 132, the pre-configured session state information, the UATI assigned to the AT for the session, and a new active set.

In one embodiment of the present invention, BS 112 may assemble a DBM that indicates that a resource has been reserved for the AT, preferably by setting a 'Reason' field of the DBM to 'resource reserved' to indicate to AT 102 that the AT is to start bearer path modification procedures. The DBM further may include a 'Data Burst Type' field that identifies the data as packet data and may or may not include at least a portion of the response received from packet data node 134, that is, the A21-Resource Allocation Response, in a payload portion of the DBM. BS 112 then conveys the DBM to AT 102 via either a forward link common signaling channel of air interface 104, a dedicated signaling channel of the air interface, or the traffic channel of the air interface assigned to AT 102.

If, when assigning resources at packet data node 134 to AT 102, a dormant packet data session does not exist and the packet data node assigns resources to the AT from a reserved pool of resources, then in response to receiving the traffic channel assignment information from the packet data node, AT 102 performs 522 a discovery of P-CSCF 140 in accordance with well-known techniques, except that the messages used in the P-CSCF discovery are tunneled between BS 112 and packet data node 134 via the A21 interface and between the BS and AT 102 using DOS over DBM. Further, if packet data node 134 assigns resources to AT 102 from a reserved pool of resources, the AT also initiates 524 a registration with the IP Core Network Multimedia Subsystem (IMS) of Home Network 150, and more particularly with CCCF/NeDS 156.

Messages sent and received between BS 112 and packet data node 134 may be passed directly over the A21 interface when the IWS 126 is collocated in circuit services network 110, such as within BS 112. When a direct A21 interface between circuit services network 110 and packet data network 130 is not available, the messages may be passed indirectly, for example, to an MSC which is connected to packet data node 134 via an A1 interface or to an MSC which is connected via an A1 interface to the IWS which is connected to the packet data node via an A21 interface. Preferably the AT initiates the IMS registration by conveying a SIP Register message to BS 112, preferably using DOS over DBM signaling. For example, AT 102 may include the SIP Register message in a DBM that may further include data fields comprising an HRPD service option (SO), such as SO 59, that identifies the Data Burst as destined for packet data network 130, and RLP information associated with the packet data, that is, an identification of the HRPD RLP flow to which the packet data is to be sent (HRPD RLPFlowID). BS 112 then sends the SIP Register message to packet data node 134, such as to an AN (A.S0008-B v0.2 architecture) or a PCF (A.S0009-B v0.2 architecture) of the packet data node. BS 112 may include the SIP Register message in an Application Data Delivery Service (ADDS) message that includes the message in an Application Data Message field in an ADDS User Part element of the ADDS message or in a DOS Deliver message and may send the message to the packet data node via the A21 interface or via any other signaling connection that the BS may have to the packet data node. Packet data node 134 then parses the message received from BS 112 to extract the SIP Register message and sends the SIP Register message to a PDSN supporting AT 102's packet data session in the packet data network, that is, PDSN 138, as normal packet data via the A10 interface, mapping the data flow to the RLP flow specified by AT 102. In this way, AT 102 may convey SIP messages to packet data node 134 and further to packet data network 130 without having to leave circuit services network 110. PDSN 138 then forwards the received packet data to I/S-CSCF 154 and the I/S-CSCF forwards the packet data to CCCF/NeDS 156.

When, at signal flow 520, AT 102 receives the DBM from BS 112 indicating that a resource has been reserved for the AT, the AT initiates the bearer path modification by initiating an IMS call to CCCF/NeDS 156. More particularly, AT 102 conveys 526 a session invitation, more particularly a SIP Invite, to BS 112 that includes a routing identifier, such as an E.164 number or a SIP URI, associated with the recipient of the session invitation, that is, CCCF/NeDS 156, and a Session Description Protocol (SDP) proposal associated with an establishment of a bearer path via air interface 132 and packet data network 130. Again, AT 102 may send the SIP Invite to BS 112 using DOS over DBM signaling, wherein the DBM may further include data fields comprising an HRPD service option (SO), such as SO 59, that identifies the Data Burst as destined for packet data network 130, and identification of the HRPD RLP flow to which the packet data is to be sent. As is known in the art, the SDP proposal may include one or more of a type of media, such as video, audio, and so on, a transport protocol, such as RTP/UDP/IP, H.320, and so on, a format of the media, such as H.261 video, MPEG video, and so on, a remote address for media, and a transport port for contact address. SDP is well-known and is described in detail in 3GPP2 Request for Comments (RFC) 2327.

BS 112 then sends the SIP Invite message to packet data node 134, such as to an AN (A.S0008-B v0.2 architecture) or a PCF (A.S0009-B v0.2 architecture) of the packet data node, via the A21 interface. Again, BS 112 may include the SIP Invite message in an ADDS message that includes the message in an Application Data Message field in the ADDS User Part element of the ADDS message or in a DOS Deliver message. Packet data node 134 then parses the message received from BS 112 to extract the SIP Invite message and sends the SIP Invite message to PDSN 138 as normal packet data via the A10 interface, mapping the data flow to the RLP flow specified by AT 102. PDSN 138 then forwards 532 the SIP Invite to I/S-CSCF 154 and the I/S-CSCF forwards 534 the SIP Invite to CCCF/NeDS 156.

In response to receiving the SIP Invite, CCCF/NeDS 156 assembles and conveys 536 an updated session invitation comprising the SDP proposal and a routing identifier associated with the recipient of the SDP proposal, that is, remote end point 172, to the remote end point. More particularly, CCCF/NeDS 156 assembles a SIP Re-invite with the updated SDP proposal and conveys 536 the SIP Re-invite to I/S-CSCF 154. I/S-CSCF 154 then forwards 538 the SIP Re-invite to remote end point 172 via far end network 170.

Based on the SDP proposal included in the session invitation, that is, the SIP Re-invite, remote end point 172 determines whether to accept the SDP proposal. When the remote end point 172 accepts the proposal or suggests a counter-proposal (as opposed to an unconditional rejection of the proposal), remote end point 172 acknowledges receipt of the updated session invitation and informs 540 I/S-CSCF 154 via far end network 170 of the acceptance of the SDP proposal included in the SIP Re-invite message or of the counter-proposal. Preferably, remote end point 172 acknowledges the proposal and conveys the acceptance of the proposal or the counter-proposal by assembling and conveying a SIP response, preferably a SIP 200 OK message, comprising the accepted SDP proposal or the counter-proposal. I/S-CSCF 154 forwards 542 the acceptance of the SDP proposal or the counter-proposal, that is, the SIP 200 OK message, to CCCF/NeDS 156. CCCF/NeDS 156 then routes the acceptance of the SDP proposal or the counter-proposal, that is, the SIP 200 OK message, to AT 102 via circuit services network 110. That is, CCCF/NeDS 156 forwards 544, 546 the SIP 200 OK message to P-CSCF 140 via I/S-CSCF 154. P-CSCF 140 forwards 548 the SIP 200 OK message to packet data node 134, and the packet data node tunnels 550 the SIP 200 OK message to BS 112 via the A21 interface. BS 112 then assembles a DBM that includes the acceptance of the SDP proposal or the counter-proposal, that is, the SIP 200 OK message, and forwards 552 the DBM to AT 102 via a forward link signaling channel or the assigned forward link traffic channel of air interface 102.

In response to receiving the acceptance of the SDP proposal or the counter-proposal, that is, the SIP 200 OK message, AT 102 acknowledges to remote end point 172 receipt of remote end point 172's acceptance of the AT's SDP proposal or the AT's acceptance of the remote end point's counter-proposal. Preferably, AT 102 acknowledges receipt of remote end point 172's acceptance of the AT's SDP proposal or the AT's acceptance of the remote end point's counter-proposal by assembling and conveying 554 a SIP ACK to BS 112 via a reverse link signaling channel of air interface 104. Again, AT 102 may send the SIP ACK to BS 112 using DOS over DBM signaling, wherein the DBM that may further include data fields comprising an HRPD service option (SO), such as SO 59, that identifies the Data Burst as destined for packet data network 130, and identification of the HRPD RLP flow to which the packet data is to be sent.

BS 112 then sends the SIP ACK message to packet data node 134 via the A21 interface. Again, BS 112 may include the SIP ACK message in an ADDS message that includes the message in an Application Data Message field in the ADDS User Part element of the ADDS message or in a DOS Deliver message. Packet data node 134 then parses the message received from BS 112 to extract the acknowledgment of the acceptance of the AT's SDP proposal or the AT's acceptance of the remote end point's counter-proposal, that is, the SIP ACK, from the message, and forwards 558 the SIP ACK as normal packet data to P-CSCF 140. AT 102 may discover the address of the P-CSCF 140 using DHCP (Dynamic Hierarchical Control Protocol) or the address of the P-CSCF may be configured in the AT. P-CSCF 140 forwards 560 the SIP ACK to I/S-CSCF 154 and the I/S-CSCF forwards 562 the SIP ACK to CCCF/NeDS 156. CCCF/NeDS 156 then routes 564, 566 the SIP ACK to remote end point 172 via I/S-CSCF 154 and far end network 170.

In addition, in response to receiving the SIP 200 OK message, AT 102 requests to be handed off to packet data network 130, and more particularly to packet data node 134, by assembling and conveying 568, to BS 112, a DBM comprising a Handoff Status message. In response to receiving the Handoff Status message, BS 112 conveys 570 a DBM to AT 102 instructing the AT to handoff to the packet data network and further comprising the traffic channel assignment information associated with a traffic channel in air interface 132 and the UATI assigned to AT 102 that was included in the A21-Resource Reservation Response message received by the BS from packet data node 134. In response to receiving the instruction to handoff, traffic channel assignment information associated with a traffic channel in air interface 132, and UATI, AT 102 tunes to packet data network 130, and more particularly one or more of a forward link signaling channel and the assigned traffic channel in air interface 132, and establishes 572 a PPP (Point-to-Point Protocol) communication session with PDSN 138 via air interface 132 and packet data node 134 in accordance with well known techniques. In turn, PDSN 138 sets up a bearer path with remote end point 172 via far end network 170 via which vocoded speech is conveyed in data packets, preferably formatted in an RTP/UDP/IP format, to the far end network. In this manner, packet data network 130, and in particular packet data node 134, acquires AT 102 on a packet data VoIP call.

Further, in response to receiving the SIP ACK message, CCCF/NeDS 156 initiates a termination of the leg of the voice call that circuit services network 110 has continued to support and maintain until such termination. More particularly, in response to receiving the SIP ACK message, CCCF/NeDS 156 conveys 574 a SIP BYE to I/S-CSCF 154 and the I/S-CSCF forwards the SIP BYE message to MGCF 124. In response to receiving the SIP BYE message, MGCF 124 requests that MGW 122 'subtract' the MGW's ephemeral terminations, preferably by using a Megaco Subtract to 'subtract,' that is, remove, the termination from the bearer path, thus removing the MGW from the bearer path of the voice call. Further, in response to receiving the SIP BYE message, MGCF 124 requests 578 that MSC 120 release the resources allocated by circuit services network 110 to AT 102, preferably by conveying an ISUP: REL message to the MSC.

In response to receiving the request to release resources from MGCF 124, MSC 120 conveys 580 a request to BS 112 to release resources allocated at the BS to AT 102 for the voice call, preferably by conveying a CLEAR COMMAND message to the BS. In response to receiving the resource release request from MSC 120, BS 112 releases the resources and informs 582 MSC 120 that the resources allocated to AT 102 have been released, preferably by conveying a CLEAR COMPLETE message to the MSC. In response to being informed by BS 112 that the resources allocated to AT 102 for the voice call have been released, MSC 120 releases the TDM trunk resources allocated to AT 102 for the voice call and informs 584 MGCF 124 that the resources allocated to AT 102 for the voice call have been released, preferably by conveying an ISUP: RLC message to the MGCF. In turn, in response to being informed by MSC 120 that the resources allocated to AT 102 for the voice call have been released, MGCF 124 informs 586 I/S-CSCF 154 that the leg of the voice call maintained by circuit services network 110 has been terminated by conveying, to the I/S-CSCF, an acknowledgment, preferably a SIP 200 OK message, of the SIP BYE message received from I/S-CSCF. I/S-CSCF 154 then informs 588 CCCF/NeDS 156 that the leg of the voice call maintained by circuit services network 110 has been terminated by forwarding the acknowledgment, that is, the SIP 200 OK message, of the SIP BYE message that the CCCF/NeDS sent to the I/S-CSCF. In response to receiving the SIP 200 OK message, CCCF/NeDS 156 sets up 590, 592 a Session Initiation Protocol (SIP) dialogue with each of AT 102 and remote end point 172 as is known in the art and a bearer path is then established 594 for a transfer of voice information between AT 102 and remote end point 172. Signal flow diagram 500 then ends.

By utilizing the A21 interface between BS 112 and wireless packet data node 134 and DOS over DBM signaling between BS 112 and AT 102, communication system 100 is able to tunnel SIP messaging between the AT and the wireless packet data node via circuit services network 110 and to tunnel HRPD traffic channel information and an HRPD identifier from the packet data network to the circuit services network 110, and via the circuit services network to the AT. Thus a handoff of a voice call involving AT 102 may be initiated from circuit services network 110 to packet data network 130 prior to the AT establishing a call dialogue with the packet data network. By facilitating an exchange of handoff information among packet data network 130, and in particular wireless packet data node 134, and AT 102 via circuit services network 110, handoff latency delays may be reduced.

More particularly, BS 112, while supporting a circuit switched voice call, determines to hand off the call and conveys, to wireless packet data node 134 via the A21 interface, a request to hand off the call to packet data network 130. In response to receiving the request, wireless packet data node 134 determines an access terminal identifier associated with AT 102 and conveys the access terminal identifier and traffic channel assignment information to BS 112 via the A21 interface. In determining the access terminal identifier, packet data node 134 determines whether AT 102 has a packet data session anchored in the packet data network. When AT 102 has a packet data session in packet data network 130, packet data node 134 may determine an access terminal identifier by determining an access terminal identifier that is associated with the MS/AT's packet data session. When AT 102 does not have a packet data session anchored in packet data network 130, the packet data node determines an access terminal identifier by assigning, to the AT, a previously reserved packet data session and an access terminal identifier. BS 112 may then convey the access terminal identifier, packet data traffic channel information, and a new active set to the AT prior to the AT establishing a call/SIP dialogue with packet data network 130. Packet data node 134 then acquires the access terminal and BS 112 may terminate the circuit switched leg of the call.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by ". . . a" does not, without more constraints, preclude the existence of additional identical elements in the process, method, article, or apparatus that the element.

What is claimed is:

1. A method for inter-network handoff of a voice call from a circuit services network to a packet data network, the method comprising:

conveying forward link voice traffic to, and receiving reverse link voice traffic from, an access terminal via the circuit services network;

determining to hand off the call;

in response to determining to hand off the call and while continuing to support the call, conveying, by a base station of the circuit services network to a wireless packet data node of the packet data network, a request to hand off the call to the packet data network as a Voice over Internet Protocol (VoIP) call;

in response to conveying the request, receiving a confirmation from the packet data network to accept the hand-in as a VoIP call;

conveying, by the base station to the access terminal, messaging that includes a packet data traffic channel, information associated with the packet data traffic channel, and a new active set for facilitating a handoff to the packet data network;

acquiring the access terminal by a base station in the packet data network; and providing, by the packet data network, the access terminal with packet data services.

2. The method of claim 1, wherein conveying messaging by the base station to the access terminal comprises conveying packet data network air interface signaling by the base station to the access terminal.

3. The method of claim 2, wherein conveying packet data network air interface signaling by the base station to the access terminal comprises conveying a packet data network Data Over Signaling message over a circuit services network Data Burst Message.

4. The method of claim 1, further comprising determining, by the packet data node, an access terminal identifier and wherein receiving a confirmation from the packet data network comprises receiving the access terminal identifier from the packet data node.

5. The method of claim 1, wherein receiving a confirmation from the packet data network comprises receiving traffic channel assignment information from the packet data network.

6. The method of claim 1, further comprising:
   determining, by the packet data node, that the access terminal has a packet data session anchored in the packet data network; and
   determining an access terminal identifier associated with the anchored packet data session.

7. The method of claim 1, further comprising:
   determining, by the packet data node, that the access terminal does not have an anchored packet data session in the packet data network; and
   in response to receiving the request to hand off the call, assigning, by the packet data node to the access terminal, a previously reserved packet data session and an access terminal identifier.

8. The method of claim 1, wherein the method farther comprises:
   maintaining, by the packet data network, a pre-configured session state information record; and
   wherein when the access terminal does not have an anchored packet data session in the packet data network, providing the access terminal with packet data services comprises providing the access terminal with packet data services based on the maintained session state information record and without first negotiating a session state information record with the access terminal over the air.

9. The method of claim 1, wherein conveying, by a base station of the circuit services network to a wireless packet data node of the packet data network, a request to handoff the call comprises conveying, by a base station of the circuit services network to a wireless packet data node of the packet data network via an interface terminating at the base station of the circuit services network and the wireless packet data node in the packet data network, a request to hand off the call to the packet data network.

10. The method of claim 9, wherein conveying, by a base station of the circuit services network to a wireless packet data node of the packet data network, a request to handoff the call comprises conveying, by a base station of the circuit services network to a wireless packet data node of the packet data network, a message requesting resources to support the call.

11. The method of claim 1, further comprising conveying, by the packet data node to the base station via an inter-Radio Access Network interface, traffic channel assignment information.

12. The method of claim 11, wherein the inter-Radio Access Network interface comprises an A21 interface and wherein conveying traffic channel assignment information by the packet data node to the base station comprises conveying, by the packet data node to the base station, an A21-Resource Allocation Response message via the A21 interface.

13. The method of claim 1, further comprising:
   conveying Proxy-Call Session Control Function discovery messaging from the access terminal to the packet data node via an A21 interface and the base station; and
   routing, by the packet data node, the discovery messaging to an Internet Protocol Multimedia Core Network Subsystem.

14. The method of claim 1, further comprising tunneling Session Initiation Protocol messaging from the access terminal to the packet data node via an A21 interface and the base station and using a Data Over Signaling message over a Data Burst Message.

15. A communication system that provides for inter-network handoff of a voice call from a circuit services network to a packet data network, the system comprising:
   a base station that supports a circuit switched voice call and that is configured to transmit forward link voice traffic to an access terminal via a forward link and receive reverse link voice traffic from the access terminal via a reverse link as part of the circuit switched voice call, determine to hand off the call to the packet data network, in response to determining to hand off the call and while continuing to support the call, convey to a packet data node of the packet data network a request to hand off the call to the packet data network as a Voice over Internet Protocol (VoIP) call, in response to conveying the request to handoff, receive a confirmation of the packet data network's acceptance of the hand-in as a VoIP call, and convey to the access terminal messaging that includes a packet data traffic channel, information associated with the packet data traffic channel, and a new active set for facilitating a handoff to the packet data network; and
   a packet data node of the packet data network that is in communication with the base station and that is configured to receive from the base station the request to hand off the call, in response to receiving the request, convey a confirmation of an acceptance of the hand-in as a VoIP call to the base station, acquire the access terminal, and provide the access terminal with packet data services.

16. The communication system of claim 15, wherein the base station is configured to receive packet data network air interface signaling from the packet data network and convey messaging to the access terminal by conveying the packet data network air interface signaling to the access terminal.

17. The communication system of claim 16, wherein the base station is configured to convey packet data network air interface signaling to the access terminal by conveying a packet data network Data Over Signaling message over a circuit services network Data Burst Message.

18. The communication system of claim 15, wherein the packet data node is configured to determine an access terminal identifier associated with the access terminal and convey the access terminal identifier to the base station, and wherein the base station is configured to convey the access terminal identifier to the access terminal.

19. The communication system of claim 15, wherein the packet data node is configured to, in response to receiving the request to handoff the call, convey traffic channel assignment information to the base station.

20. The communication system of claim 15, wherein the packet data node is configured to determine that the access terminal has a packet data session anchored in the packet data network and to determine an access terminal identifier by determining an access terminal identifier that is associated with the anchored packet data session.

21. The communication system of claim 15, wherein the packet data node is configured to determine that the access terminal does not have a packet data session anchored in the packet data network and in response to receiving the request to hand off the call, assign, to the access terminal, a previously reserved packet data session and an access terminal identifier.

22. The communication system of claim 21, wherein the base station is configured to receive a confirmation from the packet data network by receiving the access terminal identifier from the packet data network and wherein the base station further is configured to convey the access terminal identifier to the access terminal.

23. The communication system of claim 15, wherein the packet data network maintains a pre-configured session state information record and wherein, when the access terminal does not have an anchored packet data session in the packet data network, the packet data node is configured to provide the access terminal with packet data services by providing the access terminal with packet data services based on the maintained session state information record and without first negotiating a session state information record with the access terminal over the air.

24. The communication system of claim 15, wherein the base station is configured to convey, to the packet data node and via an interface terminating at the base station of the circuit services network and packet data node in the packet data network, a request to hand off the call to the packet data network.

25. The communication system of claim 24, wherein the base station is configured to convey, to the packet data node, a request to hand off the call to the packet data network by conveying a message requesting resources to support the call.

26. The communication system of claim 15, wherein the packet data node is configured to convey packet data traffic channel information to the base station via an inter-Radio Access Network interface.

27. The communication system of claim 26, wherein the inter-Radio Access Network interface comprises an A21 interface and wherein the packet data node conveys the traffic channel assignment information to the base station by conveying an A21-Resource Allocation Response message via the A21 interface.

28. The communication system of claim 15, wherein the base station is configured to receive Proxy-Call Session Control Function discovery messaging from the access terminal and to convey the Proxy-Call Session Control Function discovery messaging to the packet data node via an A21 interface, and wherein the packet data node is configured to route the discovery messaging to an Internet Protocol Multimedia Core Network Subsystem.

29. The communication system of claim 15, wherein the base station is configured to receive Session Initiation Protocol (SIP) messaging from the access terminal using a Data Over Signaling message over a Data Burst Message and route the SIP messaging to the packet data node via an A21 interface.

30. A base station that supports a circuit switched voice call and that is configured to transmit forward link voice traffic to an access terminal via a forward link and receive reverse link voice traffic from the access terminal via a reverse link as part of the circuit switched voice call, determine to hand off the call to a packet data network, in response to determining to hand off the call and while continuing to support the call, convey, to a wireless packet data node of the packet data network via an A21 interface terminating at the base station of the circuit services network and packet data node in the packet data network, an A21-Resource Allocation Request message comprising a request to hand off the call to the packet data network as a Voice over Internet Protocol (VoIP) call, in response to conveying the request to handoff, receive from the packet data node, via the A21 interface, an A21-Resource Allocation Response message that comprises an access terminal identifier and traffic channel assignment information, and convey to the access terminal messaging that includes a packet data traffic channel, information associated with the packet data traffic channel, and a new active set for facilitating a handoff to the packet data network.

31. The base station of claim 30, wherein the base station is configured to receive a confirmation from the packet data network by receiving an access terminal identifier from the packet data network.

32. The base station of claim 30, wherein the base station is configured to convey, to the packet data node, a request to hand off the call to the packet data network by conveying a message requesting resources to support the call.

33. The base station of claim 30, wherein the base station is configured to receive Proxy-Call Session Control Function discovery messaging from the access terminal and to convey the Proxy-Call Session Control Function discovery messaging to the packet data network via an A21 interface.

34. A base station that supports a circuit switched voice call and that is configured to transmit forward link voice traffic to an access terminal via a forward link and receive reverse link voice traffic from the access terminal via a reverse link as part of the circuit switched voice call, determine to hand off the call to a packet data network, in response to determining to hand off the call and while continuing to support the call, convey, to a wireless packet data node of the packet data network, a request to hand off the call to the packet data network as a Voice over Internet Protocol (VoIP) call, in response to conveying the request to handoff, receive from the packet data node a confirmation of an acceptance by the packet data network of a hand-in as a VoIP call, and convey to the access terminal messaging that includes a packet data traffic channel, information associated with the packet data traffic channel, and a new active set for facilitating a handoff to the packet data network, wherein the base station is configured to receive packet data network air interface signaling from the packet data network and to convey packet data network air interface signaling to the access terminal by conveying a packet data network Data Over Signaling message over a circuit services network Data Burst Message.

35. A base station that supports a circuit switched voice call and that is configured to transmit forward link voice traffic to an access terminal via a forward link and receive reverse link voice traffic from the access terminal via a reverse link as part of the circuit switched voice call, determine to hand off the call to a packet data network, in response to determining to hand off the call and while continuing to support the call, convey, to a wireless packet data node of the packet data network, a request to hand off the call to the packet data network as a Voice over Internet Protocol (VoIP) call, in response to conveying the request to handoff, receive from the packet data node a confirmation of an acceptance by the packet data network of a hand-in as a VoIP call, convey to the access terminal messaging that includes a packet data traffic channel, information associated with the packet data traffic channel, and a new active set for facilitating a handoff to the packet data network, and to receive Session Initiation Protocol (SIP) messaging from the access terminal using a Data Over Signaling message over a Data Burst Message and to route the SIP messaging to the packet data network via an A21 interface.

36. A wireless packet data node that supports a packet switched voice call and that is configured to receive, from a base station in a circuit services network, a request to hand off a voice call associated with an access terminal to a packet data network comprising the wireless packet data node as a Voice over Internet Protocol (VoIP) call, in response to receiving the request, conveys a confirmation of acceptance of a hand-in of the call as a VoIP call, acquires the access terminal, and provides the access terminal with packet data services, and further is configured to perform one or more of:
- determine that the access terminal has a packet data session anchored in the packet data network and to determine an access terminal identifier that is associated with a dormant packet data session; and
- determine that the access terminal does not have a packet data session anchored in the packet data network and to determine an access terminal identifier by assigning, to the access terminal, a previously reserved packet data session and an access terminal identifier.

37. The wireless packet data node of claim 36, wherein the packet data node is configured to determine an access terminal identifier associated with the access terminal and convey the access terminal identifier to the base station.

38. The wireless packet data node of claim 36, wherein the packet data node is configured to, in response to receiving the request to handoff the call, convey traffic channel assignment information to the base station.

39. The wireless packet data node of claim 36, wherein the packet data node is configured to determine a Radio Link Protocol (RLP) flow associated with the anchored packet data session and to inform the base station of the RIP flow.

40. The wireless packet data node of claim 36, wherein the packet data node is configured to convey packet data traffic channel information to the base station via an inter-Radio Access Network interface.

41. A wireless packet data node that supports a packet switched voice call and that is configured to receive, from a base station in a circuit services network, a request to hand off a voice call associated with an access terminal to a packet data network comprising the wireless packet data node as a Voice over Internet Protocol (VoIP) call, in response to receiving the request, conveys a confirmation of acceptance of a hand-in of the call as a VoIP call, acquires the access terminal, and provides the access terminal with packet data services, and further s configured to perform one or more of:
- receive, via an A21 interface, an A21-Resource Allocation Request message comprising the request to hand off the call to the packet data network and to convey the confirmation by assembling and conveying an A21-Resource Allocation Response message to the base station via the A21 interface;
- maintain a pre-configured session state information record and wherein, when the access terminal does not have an anchored packet data session in the packet data network, provide the access terminal with packet data services by providing the access terminal with packet data services based on the maintained session state information record and without first negotiating a session state information record with the access terminal over the air; and
- receive Proxy-Call Session Control Function discovery messaging from the base station and route the discovery messaging to an Internet Protocol Multimedia Core Network Subsystem.

* * * * *